(12) United States Patent
Skultety-Betz et al.

(10) Patent No.: US 7,751,033 B2
(45) Date of Patent: Jul. 6, 2010

(54) METHOD FOR THE MEASUREMENT OF THE LENGTH OF A LINE AND DEVICE FOR CARRYING OUT SAID METHOD

(75) Inventors: Uwe Skultety-Betz, Leinfelden-echterdingen (DE); Bjoern Haase, Stuttgart (DE); Joerg Stierle, Waldenbuch (DE); Peter Wolf, Leinfelden-Echterdingen (DE); Gunter Flinspach, Leonberg (DE); Cedric Pahud, Morges (CH); Kai Renz, Leinfelden-echterdingen (DE); Clemens Schulte, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/576,994

(22) PCT Filed: Dec. 7, 2005

(86) PCT No.: PCT/EP2005/056575

§ 371 (c)(1),
(2), (4) Date: Apr. 10, 2007

(87) PCT Pub. No.: WO2006/081889

PCT Pub. Date: Aug. 10, 2006

(65) Prior Publication Data

US 2008/0088817 A1   Apr. 17, 2008

(30) Foreign Application Priority Data

Jan. 31, 2005   (DE) .................. 10 2005 004 321

(51) Int. Cl.
*G01C 3/08* (2006.01)
(52) U.S. Cl. .................. 356/4.01; 356/3.01; 356/3.1; 356/4.1; 356/5.01; 356/5.1

(58) Field of Classification Search ........ 356/3.01–3.15, 356/4.01–4.1, 5.01–5.15, 6–22; 35/3.01–3.15, 35/4.01–4.1, 5.01–5.15, 6–22
See application file for complete search history.

(56) References Cited

U.S. PATENT DOCUMENTS

2003/0098973 A1   5/2003   Schmidt et al.

(Continued)

FOREIGN PATENT DOCUMENTS

DE   198 36 812   2/2000

(Continued)

*Primary Examiner*—Thomas H Tarcza
*Assistant Examiner*—Luke D Ratcliffe
(74) *Attorney, Agent, or Firm*—Michael J. Striker

(57) ABSTRACT

The invention relates to a method for measurement of a line (S), in particular, an optical distance measurement method, whereby an input means (24,42) of a distance measuring device (20,22) is operated, which triggers a measuring sequence of distance measurements, during which individual measurements (10-16) of distances from the distance measuring device (20,22) triggered by the distance measuring device (20,22) are carried out perpendicular to the line (s) for measurement. According to the invention, at least one maximum value (10,16) and at least one minimum value of the distances are determined from the measuring sequence and the length of the line (s) determined from the at least one maximum value (10,16) and the at least one minimum value (13). The invention further relates to a distance measuring device (20,22), in particular, a hand-held measuring device for carrying out said method.

11 Claims, 3 Drawing Sheets

U.S. PATENT DOCUMENTS

2004/0114129 A1 * 6/2004 Gogolla et al. ............. 356/4.01
2008/0088817 A1    4/2008 Skultety-Bezt et al.

FOREIGN PATENT DOCUMENTS

| | | | |
|---|---|---|---|
| DE | 19836812 | * | 2/2000 |
| DE | 100 16 309 | | 10/2001 |
| DE | 102 53 669 | | 6/2004 |
| DE | 10 2005 004 321 | | 8/2006 |
| WO | 2006/081889 | | 8/2006 |

* cited by examiner

# METHOD FOR THE MEASUREMENT OF THE LENGTH OF A LINE AND DEVICE FOR CARRYING OUT SAID METHOD

CROSS-REFERENCE TO A RELATED APPLICATION

The invention described and claimed hereinbelow is also described in German Patent Application DE 10 2005 004 321.6 filed on Jan. 31, 2005. This German Patent Application provides the basis for a claim of priority of invention under 35 U.S.C. 119(a)-(d).

BACKGROUND OF THE INVENTION

The present invention relates to a method for measuring the length of a line using a distance measuring device, and a device for carrying out the method.

Distance measuring devices, and hand-held distance measuring devices in particular, e.g., optoelectrical distance measuring devices or ultrasonic rangefinders, have been known per se for a long period of time, and they are commercially available. These devices emit a modulated measurement beam, e.g., a light beam in the form of a laser beam, that is directed toward a desired target object whose distance from the device is to be determined. The returning measurement signal—or at least a portion thereof—that has been reflected by the target object is detected by a sensor in the device and is used to determine the distance in question between the measuring device and the target object.

Typical fields of application of devices of this type include, e.g., the trade sector, the construction industry or interior finishing, when a user wants to determine certain lines, surface areas or volumes as quickly as possible and with a high degree of accuracy. To perform a measurement, for example, a distance measuring device of this type with a reference plane assigned thereto is held against a first wall, for instance, then the operating unit is actuated and a measurement signal is emitted, in order to measure a distance to a second wall. Since, with distance measuring devices of this type, the measurement signal is typically emitted in one direction, the reference plane of the measuring device, i.e., the plane used as the reference for the distances measured with the device, must be located as precisely as possible on the zero point of the line to be determined.

Publication DE 102 53 669 A1 makes known a hand-held laser rangefinder that employs an extreme-value measurement method, with which, in a first step, input means of the hand-held laser rangefinder are actuated, thereby triggering a measurement sequence, during which, in a second step, individual distance measurements initiated by the hand-held laser rangefinder are carried out. In a third step, the hand-held laser rangefinder according to DE 102 53 669 A1 determines at least one maximum value and/or one minimum value from the sequence of individual measurements. Based on the at least one minimum value and the at least one maximum value, the hand-held laser rangefinder determines the difference between the extreme values in the sequence of measurements. Based on this extreme-value difference, it is possible to derive, e.g., the exact position of objects such as pipework or cladding relative to surfaces such as walls or ceilings. For example, the break recess of a wall can be determined using the extreme-value measurement method described in DE 102 53 669 A1.

Publication DE 198 36 812 A1 makes known a hand-held laser rangefinder for distance measurement that uses the phase or transit time measurement method, with which a large number of measurement routines for solving application-specific measuring tasks is stored in the arithemetic unit of the measurement device. These measurement routines can be called up using a button on the keypad of the measuring device and displayed in the display field of the device. After the user of the hand-held laser rangefinder described in DE 198 36 812 A1 selects a measurement routine of this type, he is prompted via a menu in the display field of the device to perform individual measurements of a path in succession. The results are used by an arithmetic unit in the measuring device to calculate a distance, surface area, or volume in question.

Based on the devices in the related art, the object of the present invention is to provide a user with a simple and, therefore, user-friendly procedure for measuring lines, thereby enabling him to determine—in particular—distances that cannot be measured directly.

SUMMARY OF THE INVENTION

It is therefore an object of the present invention to provide a new method for measuring the length of a line and a new measuring device.

The object on which the present invention is based is attained via a method for measuring the length of a line, which has the features listed in claim 1, and by a measuring device having the features listed in claim 7.

With the inventive method for measuring the length of a line, input means of a distance measuring device are actuated in a first step, thereby triggering a sequence of distance measurements. In a second step of the inventive method, during the measurement sequence, individual measurements of distances from the measuring device are carried out transversely to the line to be measured. Based on these individual measurements, in a further step, at least one maximum value and at least one minimum value of the transverse distances from the measuring device to the line to be measured are determined and, based on this maximum value and the minimum value, the length of the line in question is determined.

The claimed, indirect measurement mode for determining the length of a line enables a user to determine the length of this line in one procedure, simply by performing a horizontal sweeping motion with the distance measuring device and, therefore, the measurement signal, along the line to be measured. In particular, the user is no longer required to carry out a certain sequence of individual measurements. He merely needs to start the measurement sequence and perform a horizontal sweeping motion with the measurement signal along the line to be measured. The length of the line in question is then determined based on the distances between the measurement device and the line to be measured, which are determined during this scan across the line to be measured.

This determination can be carried out, advantageously, by the distance measuring device itself.

Advantageously, it is not necessary that any angles be detected. This makes it possible to design a compact, economical measuring device, since there is no need to integrate an angle-measuring system in the distance measuring device.

From among the sequence of individual measurements carried out, a related evaluation algorithm selects at least one maximum value and at least one minimum value of the measured transverse distances from the measuring device relative to the line to be measured and, based thereon, determines the length of the line in question, using trigonometric functions in particular. The fact that extreme values are used to determine the line length eliminates the need to explicitly record, i.e., detect, an angle, since the measured minimum value of the transverse distance to the line to be measured implicitly defines the perpendicular direction and, therefore, the presence of a 90° angle between the current measuring distance and the orientation of the line to be measured.

Advantageous refinements of the method mentioned in the independent claim are possible due to the features listed in the dependent claims.

An advantageous embodiment of the inventive method determines the length of the line to be measured based on at least two maximum values, particularly the values of two local maxima of the distance between the distance measuring device and the line to be measured, and a minimum value of these measured lines. Using an evaluation method of this type it is possible to measure the length of the line to be determined, independently of the position of the distance measuring device relative to the position of the line. The line can be advantageously determined based on a series of individual measurements carried out transversely to the line to be determined. This represents a marked simplification of the measurement procedure for the user. With this measurement method, a user—from his position—merely needs to aim at the starting point of the line to be measured and then sweep the measurement signal horizontally along the line to be measured until it reaches the end of this line. In particular, it is no longer necessary to establish a reference point of the distance measuring device at the zero point of the line to be measured. This makes it possible to measure lines that are difficult to access using conventional methods.

Advantageously, the inventive method is started by actuating input means on the distance measuring device, and it is terminated by actuating these input means a second time.

In alternative embodiments of the inventive method, it can be provided that the method is carried out for as long as the input means of the distance measuring device are actuated, i.e., the measurement of the line length is terminated by releasing the input means.

It can also be provided, e.g., that the length of the line determined so far is communicated to a user while the sequence of measurements is still being carried out, via an output unit of the distance measuring device being used. In this manner, it is possible, e.g., to not only determine the length of an unknown line, it is also possible subtract a subsection having a specified length from a longer, unknown line length.

A distance measuring device for carrying out the inventive method advantageously includes at least one input means, which are used to activate a sequence of transverse distance measurements between the measuring device and the line to be measured. Based on this sequence of measurements, the extreme values, e.g., two local maxima and an absolute minimum of the transverse distances from the measuring device to the line to be measured, are determined by an arithmetic unit in the distance measuring device and, based on these extreme values, the length of the line to be measured is determined.

The line length determined in this manner and the transverse distances of the distance measuring device to the line to be measured can be communicated to a user of the distance measuring device via an acoustic or optical output unit, e.g., an optical display.

An advantageous embodiment of a distance measuring device for carrying out the inventive method includes at least one light source, e.g., a laser, particularly a semiconductor laser diode, for generating and emitting modulated optical radiation.

Using this modulated radiation, the required distances to the line to be measured are determined using a transit time or phase measurement method.

The distance measuring device for carrying out the inventive method can be designed, advantageously, as a laser rangefinder, particularly a hand-held laser rangefinder. This makes it possible to measure the length of a line in this manner: A user performs a horizontal sweep with the measurement signal, particularly a modulated optical signal, from a starting point on the line to be measured toward an end point of the line, then the length of the line to be measured is determined based on a large number of distance measurements carried out transversely to the line to be measured, without a pivoting angle having been measured.

The inventive method therefore makes it possible for a user to determine the length of a line without the requirement that the distance measuring device be placed precisely on a zero point of the line. In particular, the inventive method makes it possible to measure a line length by measuring distances transversely to the orientation of the line to be measured.

Further advantages of the inventive method and/or a distance measuring device for carrying out the inventive method result from the drawing and the associated description.

An exemplary embodiment of the inventive method for distance measurement is depicted in the drawing, and it is described in greater detail in the subsequent description. The figures in the drawing, their description and the claims directed to the subject of the present invention contain numerous features in combination. One skilled in the art will also consider these features and the associated claims individually and combine them to form further reasonable combinations and claims.

DESCRIPTION OF THE PREFERRED EMBODIMENTS

Figure 1:
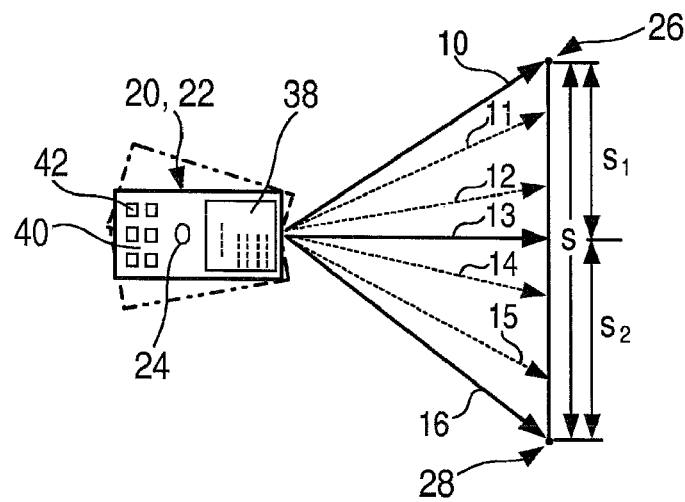
FIG. 1 shows a schematic depiction of the measurement of a line length, to illustrate the inventive method.

FIG. 1 shows a schematicized depiction of the measurement situation on which the inventive method is based. The inventive method makes it possible to determine the length of a line s using a sequence of distance measurements carried out transversely to the line to be measured. A distance measuring device 20, which is designed as a laser rangefinder 22 in the exemplary embodiment in FIG. 1, is activated using input means, which are designed, e.g., as a measurement button 24, in order to carry out a large number of individual measurements 10 through 16. A user—from his standpoint—aims measurement beam 10 at a starting point 26 of the line to be measured and starts the distance measurement between measuring device 22 and line s to be measured. This first measured value is stored by a memory medium and/or an appropriately designed software that is loaded in distance measuring device 20.

The user now sweeps distance measuring device 20 horizontally such that the measurement signal scans line s to be measured. While this scan motion is being carried out, a large number of individual measurements 10 through 16 of the particular distance is carried out along the horizontal sweep. During each of these measurements, the particular transverse distance of the measuring device to the line is determined by measuring the distance of the measuring device to an impact point on the line. The sequence of distance measurements depicted in the exemplary embodiment in FIG. 1 is composed of seven individual distances measurements 10 through 16, for example. The distances of these individual measurements are determined by an evaluation unit in distance measuring device 20, and the following data are stored, at the least: The minimum distance—which corresponds to distance measurement 13 in the exemplary embodiment shown in FIG. 1—and a second local maximum (measurement 16 in the exemplary embodiment depicted in the figure), which is reached after the minimum is passed through.

When the scan motion of the measurement beam reaches an end point 28 of the line that the user wants, he can actuate the measurement button once more or, e.g., release the measurement button, to terminate the measurement procedure. Based on the sequence of distance measurements carried out during the scan motion across the line to be measured, the minimum value is selected—this corresponds to individual measurement 13 in the exemplary embodiment in FIG. 1—and two local maximum values are selected—they correspond to individual measurements 10 and 16 in the exemplary embodiment in FIG. 1—and they are forwarded to an arithmetic unit in distance measuring device 22.

Based on these three stored measured values, it is possible to determine the length of line s in question using trigonometric relationships. For example, line s is the sum of two sub-lines $s_1$ and $s_2$; lines $s_1$ and $s_2$ can be determined in a known manner using the Pythagorean theorem based on the transverse distances of measurements 10 and 13 and 16 that were determined. The fact that extreme values are used to determine the line length eliminates the need, in particular, to detect, i.e., measure, a pivoting angle of the device, since measured minimum value 13 of the transverse distance to line s to be measured defines the perpendicular direction and, therefore, implies that there is a 90° angle between current measuring device 13 and the orientation of line s to be measured. In this manner, the length of the desired line can be determined by applying the Pythagoream theorem one or more times.

The length of the line to be measured can be advantageously determined by measuring distances transversely to this line. With the inventive method, it is no longer required that the distance measuring device be oriented in parallel with the line to be measured. Nor is it necessary to establish a reference point of the distance measuring device on a starting point of the line to be measured. The required measurement data for determining the line length in question are also recorded automatically by the distance measuring device while the user performs a scan motion. The user is no longer required to carry out a series of individual measurements in order to obtain the data required.

In the exemplary embodiment shown in FIG. 1, laser rangefinder 22 includes an output, unit in the form of a graphical display 38, in which the results of individual measurements and the length of the line to be measured can be displayed. In addition, the distance measuring device includes a control field 40 with a large number of control units, via which individual measurement programs, e.g., to measure a line, surface area or volume, can be called up. Using a control button 42 on control field 40, it is also possible, e.g., to select the inventive method for determining the length of a line. The measurement can then be started and terminated by actuating measurement button 24.

The claimed measurement method therefore makes it possible for the user to determine the length of this line in a single measurement procedure, simply by performing a horizontal sweeping motion with the distance measuring device along the line to be measured. To do this, he merely needs to guide the modulated measurement signal along the line to be measured. Advantageously, a control and evaluation program—which can be integrated in the distance measuring device—selects a minimum value of the distances and two local maximum values from the distance measurements between the distance measuring device and the line to be measured that were carried out during the scan motion. The length of the line can be computed based on these three distances that were determined. This can be carried out, advantageously, without the need to detect any information about angles. Advantageously, it is therefore not necessary to integrate an angle-measuring system in the distance measuring device. The user merely needs to make a horizontal sweeping motion with the distance measuring device around a defined rotation point. Using the inventive method with a distance measuring device, a user can therefore determine the length of a line simply by carrying out distance measurements transversely to the line to be measured. Nor is it necessary, in particular, to place the distance measuring device or a reference point of this device on a starting point or end point of the line to be measured.

Using the inventive method, it is therefore also possible to measure the length of a line from large distances away with relatively good accuracy.

A prerequisite of the inventive method is that a user be able to locate the start and end point of the line to be measured relatively well using the scanning measurement signal, since these points usually also determine the local maxima of the distance in question.

In reality, i.e., during a specific on-site measurement, conditions exist that make it difficult for a user to locate the start and/or end point of the line to be measured.

Figure 2:
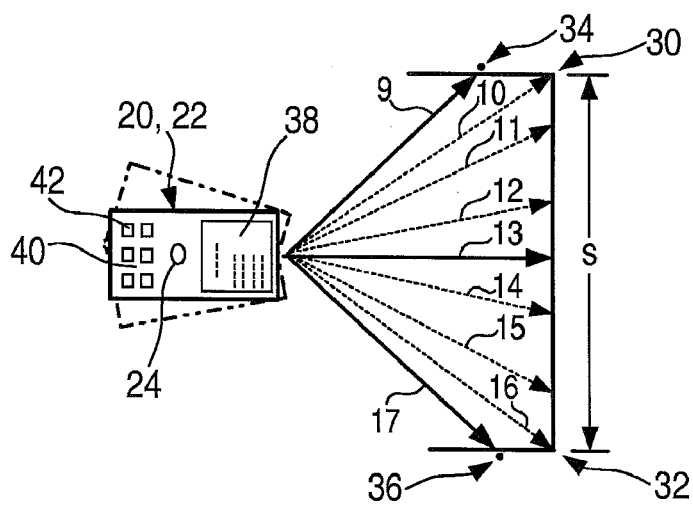
FIG. 2 shows a first exemplary application of the inventive method, in a schematic illustration of a measurement situation.

The scenario depicted schematically in FIG. 2 could be the corner of a room, for example. If, in the first and last measurement carried out to scan line s, corner 30 and 32 are left out and, instead, measurements 9 and 17 aim at and measure points 34 and 36, the evaluation algorithm of the inventive method determines measurements 10 and 16 anyway, as the local maxima of the transverse distances of measurement sequence 9 through 17. Local maxima 10 and 16 are determined, e.g., by evaluating the changes in the individual transverse distances relative to each other. A local maximum of the distances transverse to the line to be measured occurs in the direction of individual measurement 10, since the distances of measurements 9, 11 or 12 are shorter. It is therefore possible to determine the correct extreme value in order to calculate the length of line s in question.

Figure 3:
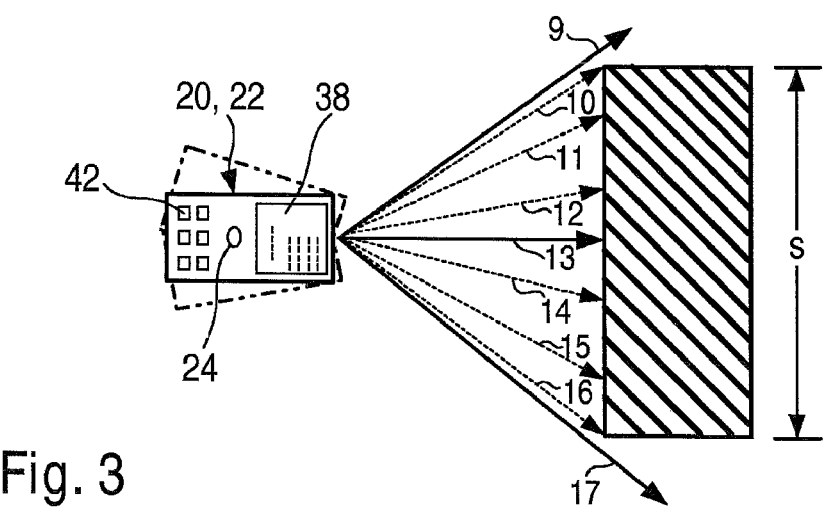
FIG. 3 shows a second exemplary application of the inventive method, in a schematic illustration of an alternative measurement situation.

FIG. 3 shows another possible scenario that could result in measured values becoming corrupted. The scenario depicted schematically in FIG. 3 could be the wall of a house, for example, length s of which is to be determined. If the wall would be missed in first and last measurements 9 and 17 in the measurement sequence, the measuring device would determine incorrect maximum values of transverse distances between distance measuring device 22 and line s to be measured. Since, in this case, however, a large jump in distance occurs between two consecutive, individual measurements (between measurements 9 and 10, and 16 and 17 in this case), this fact can be detected by an appropriate evaluation logic stored in software in the device, for example, and it can be taken into account in the determination of the length of line s.

With the inventive method, the extreme values (local maxima and/or minima) for determining the length of the line in question are therefore determined using a calculating specification that takes into account the relative change in distances within the sequence of measurements. Large discrete jumps in the measured distances of the schematically in FIG. 3, this means that, e.g., measurement 17 is not used to determine the length of line s, since this measurement is a marked jump in the distance measured between measuring device 22 and the wall to be measured as compared with measurement 16, which was carried out immediately before it. The computation and evaluation unit of the measuring device therefore uses the distance of measurement 16 instead as the local maximum of the distances, since this value is the last value in a series of transverse distances that increase continually and steadily, starting with measurement 13.

In the exemplary embodiment in FIG. 3, the length of line s would therefore be determined based on distance measurements 10, 13 and 16. The inventive method therefore makes it possible to carry out a plausibility check of the extreme values to be used to calculate the measured result, using a computation algorithm. The plausibility check determines, e.g., whether two consecutive values in the sequence of distance measurements yield very different measurement results.

This algorithm for checking the plausiblity of the extreme values that are determined represents an enormous simplification for the user in terms of carrying out and applying the inventive method. In the inventive measurement mode, the user can therefore also start the measurement sequence and his horizontal sweeping motion roughly before the actual start point of the line to be measured, and he can also extend the measurement sequence past the end point of the line to be measured, since the program control of the inventive method selects the correct, i.e., plausible measured values using a related filtering algorithm.

Figure 4:
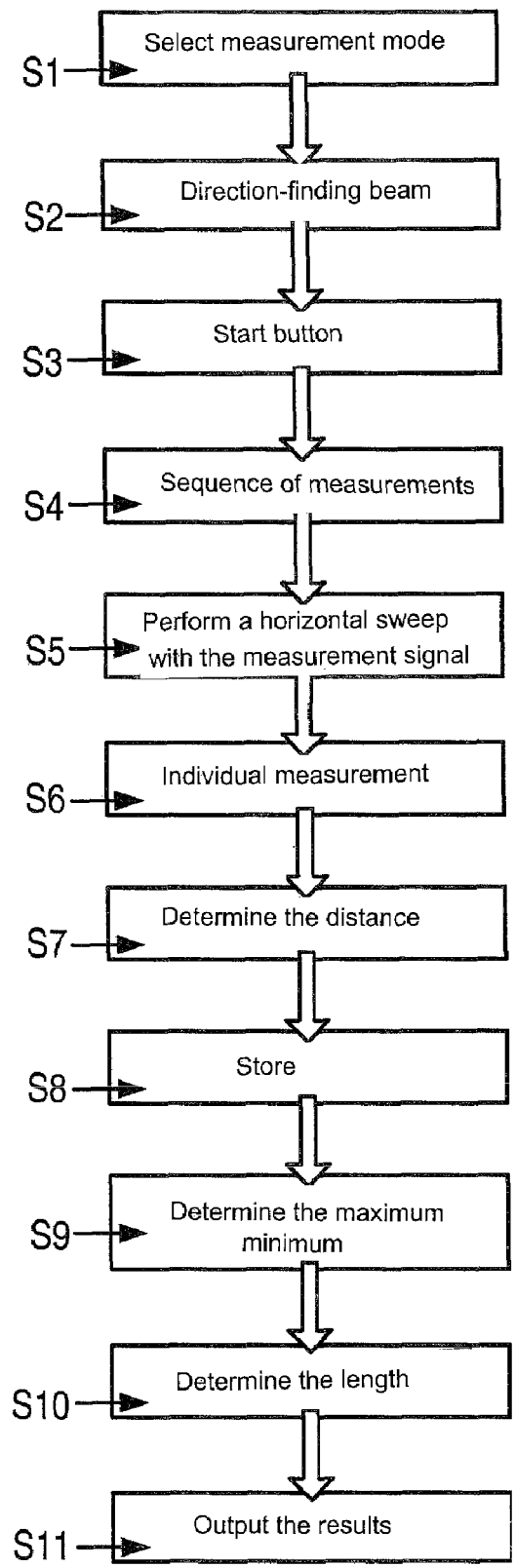
FIG. 4 shows a flow chart that depicts some of the method steps in the inventive method.

FIG. 4 shows the individual steps in the inventive method in the form of a flow chart.

In a step $S_1$, a measurement mode that carries out the method is selected on a distance measuring device in order to carry out the inventive method. This can take place, e.g., by actuating a mode button 42 on control field 40, as shown in FIGS. 1 through 3. By selecting measurement mode 42, the inventive distance measuring device is set to carry out the inventive method, and a continual direction-finding beam is emitted from the distance measuring device, e.g., as method step $S_2$. By actuating a start button, e.g., measurement button 24 in exemplary embodiments 1 through 3, a sequence of distance measurements ($S_4$) is initiated in step $S_3$. While this sequence of distance measurements is being carried out, a user performs a horizontal sweeping motion—in a further step $S_5$ of the method—with the measurement signal emitted by the distance measuring device along the line to be measured, so that—in a method step—$S_6$—individual measurements of distances between the measuring device and the line to be measured are carried out. For this sequence of individual distance measurements, the particular distances are determined in method step $S_7$, and they are stored in a memory medium in method step $S_8$. In method step $S_9$, the current local maxima and a minimum of the distances between the measuring device and the line to be measured are determined. As an alternative, only at least one maximum value and at least one minimum value of the distances between the measuring device and the line to be measured could be determined and stored. Based on these extreme values—that were determined—of the transverse distances between the measuring device and the line to be measured, the length of the line in question is determined in a method step $S_{10}$ using known trigonometric functions. In a method step $S_{11}$, the length of the line to be measured and, e.g., the extreme values that were determined are communicated to the user via an output unit, e.g., an optical display in the distance measuring device.

In an alternative embodiment of the inventive method, it can be provided, e.g., that the length of the line already traversed during a measurement scan $S_{11}$, i.e., the length of the line already traversed by the measurement signal and determined using the method described, is communicated to the user directly, e.g., by displaying this information in the display of the distance measuring device. In a measurement mode of this type, a user can then subtract the length of a desired segment of the line, e.g., directly on a wall, and he can mark it.

Via special positioning the user and/or the distance measuring device, the inventive method can also determine the length of the line in question using only one minimum value and a maximum value of transverse distances of the distance measuring device to the line to be measured. It is necessary, however, for the sequence of measurements to be started and terminated with the minimum distance. To this end, a user and/or the distance measuring device must be positioned perpendicularly to the fine to be measured, and at the level of the start and end point of this line. The inventive distance measuring device can take this special case of the inventive method into account using a separate measurement mode, which can be selected, e.g., using a special control button on control field 40. In particular, the evaluation software should be designed to be so flexible that it does not matter which distance measurement value, i.e., the maximum or minimum of transverse distances, the user uses to start his measurement sequence.

This method is also suited, in particular, for subtracting a predetermined length.

Figure 5:
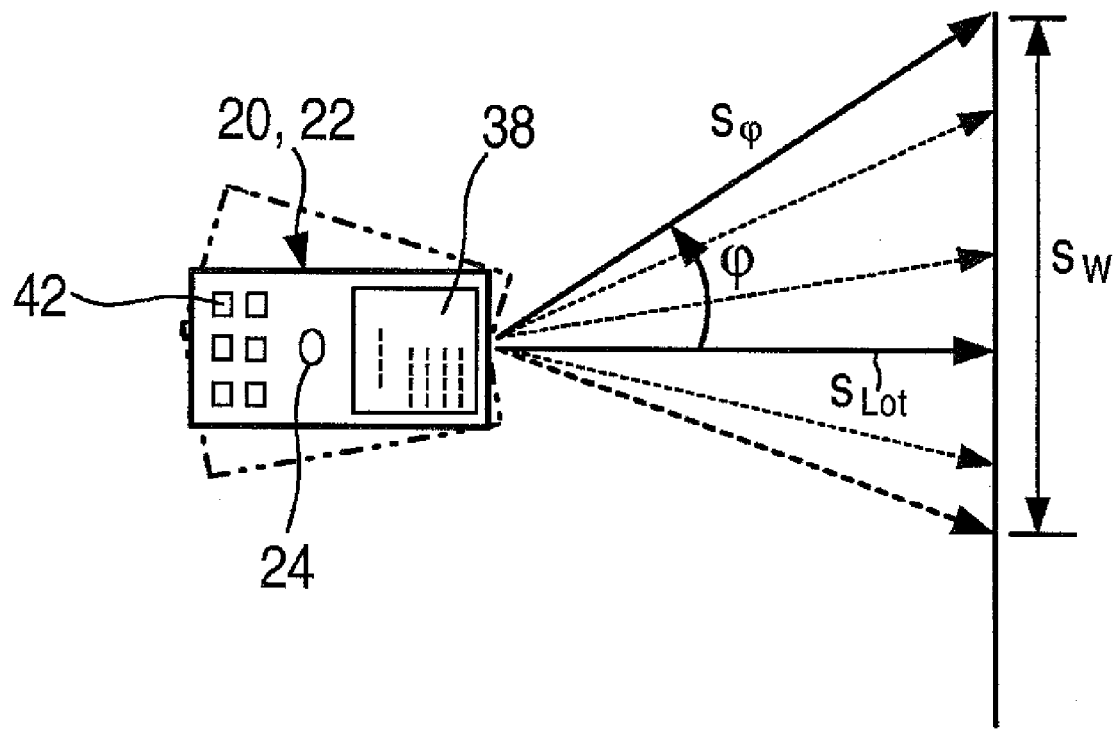
FIG. 5 shows a schematic illustration of an angle measurement using the inventive method.

The method is also suited, in particular, for using the inventive distance measuring device as an angle measuring device, as depicted schematically in FIG. 5. When measuring device 20, 22 is intially swept horizontally along a certain line $s_W$, e.g., a wall, a free-standing wall, or a ceiling, so that the perpendicular—as the minimum distance between line $s_W$ and distance measuring device 20 or 22—is known, every angle φ with this perpendicular line can be calculated directly. The following applies:

$$\phi = \arccos(s_{Lot}/s_\phi)$$

Line $s_{Lot}$ refers to the distance—along the perpendicular—between distance measuring device 20, 22 and scanned line $s_w$. Line $s_\phi$ refers to the distance between distance measuring device 20, 22 and scanned line $s_w$ at angle φ. It is also possible, of course, to determine angles φ' of two directions $s_\phi$ and $s_{\phi'}$, neither of which is the perpendicular $s_{Lot}$.

The inventive method and a distance measuring device for carrying out the inventive method are not limited to the embodiments depicted in the drawing and described in the related description.

In particular, the inventive method is not limited to the use of an optical distance measuring device. The inventive method can be realized in the same manner, e.g., with an ultrasonic rangefinder or a radar-based rangefinder.

What is claimed is:

1. An optical distance measurement method for measuring a line (2), comprising the following steps:

actuating input means (24, 42) of a distance measuring device (20, 22), thereby triggering a single, continuous sequence of distance measurements;

performing individual measurements (10-16) of distances from the distance measuring device (20, 22) transversely to the line (s) to be measured during said sequence of distance measurements;

determining at least one maximum value (10, 16) and at least one minimum value (13) of the distances from the single sequence of measurements of a scan over the line (s) to be measured; and determining a length of the line (s) based on the at least one maximum value (10, 16) and the at least one minimum value (13).

2. The method as recited in claim 1, wherein the length of the line (s) is determined based on at least two maximum values (10, 16), the values of two local maxima in particular, and a minimum value (13) of the distances measured.

3. The method as recited in claim 2, wherein the extreme values for determining the length of the line are determined using a calculating specification that takes into account the relative change in distances from the measuring device (20, 22) transversely to the line within the sequence of measurements.

4. The method as recited in claim 1, wherein the measurement of the line length is terminated by actuating the input means (24) once more.

5. The method as recited in claim 1, wherein the measurement of the line length is terminated by releasing the input means (24).

6. The method as recited in claim 1, wherein the length of the line (s) determined so far during a sequence of measurements is communicated to a user via an output unit (38) of the distance measuring device (20, 22).

7. A distance measuring device (20, 22) for carrying out the method as recited in claim 1, wherein it includes at least one input means (40, 24) for activating a measurement sequence for measuring the length of a line (s).

8. The distance measurement device as recited in claim 7, wherein it includes at least one output unit (38) for communicating the line length that was determined.

9. The distance measurement device as recited in claim 7, wherein the devices includes at least one light source for emitting modulated optical radiation.

10. The distance measuring device as recited in claim 7, wherein the device is a laser rangefinder (24).

11. The distance measuring device as recited in claim 10, wherein the device is a hand-held laser rangefinder.

\* \* \* \* \*